(12) United States Patent
Kubo (10) Patent No.: US 6,276,506 B1
(45) Date of Patent: Aug. 21, 2001

(54) ELECTROMAGNETIC CLUTCH

(75) Inventor: Tsutomu Kubo, Akashi (JP)

(73) Assignee: Kyocera Mita Corporation, Osaka-fu (JP)

( * ) Notice: Subject to any disclaimer, the term of this patent is extended or adjusted under 35 U.S.C. 154(b) by 0 days.

(21) Appl. No.: 09/540,457

(22) Filed: Mar. 31, 2000

(30) Foreign Application Priority Data

Apr. 2, 1999 (JP) .................................................. 11-096943
Oct. 8, 1999 (JP) .................................................. 11-288315

(51) Int. Cl.[7] .................................................. F16D 27/02
(52) U.S. Cl. ........................................................ 192/84.961
(58) Field of Search ............................. 192/84.961, 84.1, 192/84.9, 84.96, 66.32

(56) References Cited

U.S. PATENT DOCUMENTS

| | | | |
|---|---|---|---|
| 4,079,821 | * | 3/1978 | Miller .................................. 192/84 C |
| 4,346,616 | * | 8/1982 | Geisslinger et al. ............... 192/84 C |
| 4,664,238 | * | 5/1987 | Nishino et al. .................... 192/84 C |
| 4,955,954 | * | 9/1990 | Onishi et al. ................... 192/84 C X |
| 4,984,668 | * | 1/1991 | Onishi et al. ....................... 192/84 C |
| 5,036,368 | * | 7/1991 | Nakamura ....................... 192/84 C X |
| 5,038,905 | * | 8/1991 | Nakamura ........................... 192/84 C |
| 5,080,214 | * | 1/1992 | Fossum ........................... 192/84 C X |
| 5,148,902 | * | 9/1992 | Nakamura ........................... 192/84 C |
| 5,735,375 | * | 4/1998 | Booth et al. ...................... 192/84.961 |
| 5,762,173 | * | 6/1998 | Nishimura ....................... 192/84.961 |
| 5,862,906 | * | 1/1999 | Howrie ............................ 192/84.961 |
| 6,031,309 | * | 2/2000 | Nishimura ................... 192/84.961 X |
| 6,112,872 | * | 9/2000 | Miwa et al. ................. 192/84.961 X |

* cited by examiner

Primary Examiner—Rodney H. Bonck
Assistant Examiner—Saúl Rodríguez
(74) Attorney, Agent, or Firm—Jordan and Hamburg LLP (57) ABSTRACT

An electromagnetic clutch has a field coil including an energizing coil, a shaft which is mounted inside the energizing coil and the field coil and is set rotatable about an axis thereof, a rotor which is non-rotatably mounted on the shaft at a position opposing the field coil, a gear which is rotatably mounted on the shaft, an armature which is mounted on the shaft on the side of the rotor and is set rotatable with the gear, and an O-ring made of a resilient material for setting the armature away from the gear toward the rotor due to a resilient force thereof when the energizing coil is excited. An outer circumference of the shaft at a position for engaging with the rotor is generally configured into a decagonal shape in cross section, and the contour of a through hole of the rotor for fitting the shaft has a generally decagonal shape in cross section.

17 Claims, 10 Drawing Sheets

ELECTROMAGNETIC CLUTCH

This application is based on patent application Nos. 11-96943 and 11-288315 filed in Japan, the contents of which are hereby incorporated by reference.

BACKGROUND OF THE INVENTION

The present invention relates to an electromagnetic clutch in which a shaft rotatable about an axis thereof is electrically connected to an input-side rotary member such as a gear, which is rotatably mounted onto the shaft.

Generally, an electromagnetic clutch of the above type is used as a part operatively connected to a sheet feed mechanism of an image forming apparatus such as a copier. As an example, the electromagnetic clutch includes a shaft rotatable about an axis thereof, an input-side rotary member (a gear), an output-side rotary member (rotor), a drive transmitting member (an armature) which is provided between the gear and the rotor and rotatable together with the gear. When the armature is magnetically attracted to the rotor against an urging force of a plate spring or the like due to a magnetic flux generated by an electromagnetic induction generating section, the rotation of the gear is transmitted to the shaft.

Figure 18:
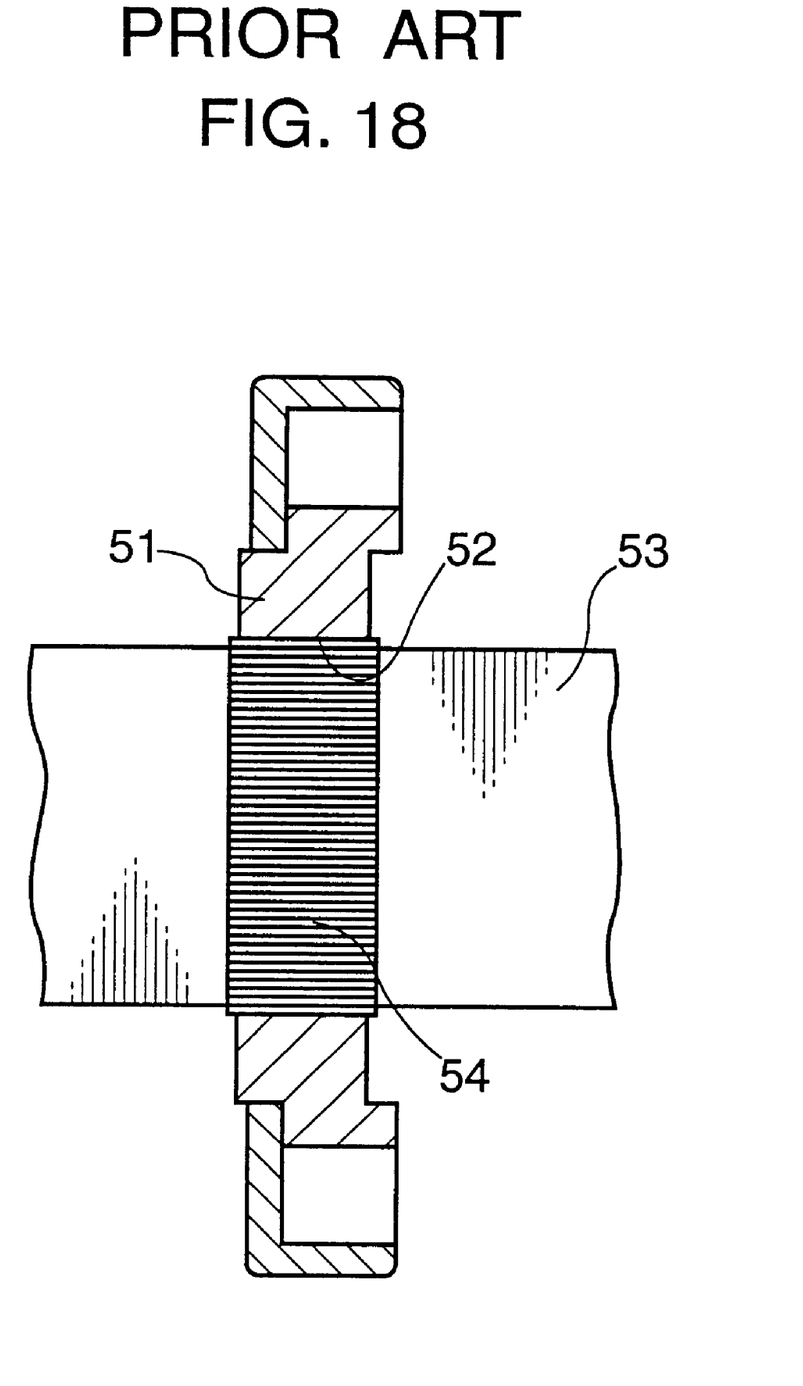
FIG. 18 is a diagram of an electromagnetic clutch of prior art showing an assembled state that a rotor is mounted onto a shaft.

The electromagnetic clutch having the above construction is, for example, shown in the cross-sectional diagram of FIG. 18. In FIG. 18, numeral 51 is a rotor, 52 is a center through hole of the rotor 51, 53 is a shaft, 54 is a knurled threaded portion formed on the outer circumference of the shaft 53. The electromagnetic clutch is assembled in such a manner that the shaft 53 is pressfitted into the through hole 52 of the rotor 51 with the knurled threaded portion 54 of the shaft 53 pressing the rotor 51 at a portion corresponding to the through hole 52. Alternatively, the rotor 51 is loosely mounted onto the shaft 53 and then fastened thereon by swaging the rotor 51 at a part corresponding to the through hole 52.

In the above-constructed electromagnetic clutch, pressfitting or swaging is necessary when mounting the rotor 51 onto the shaft 53, which makes an assembling operation of the electromagnetic clutch complex.

Also, when mounting the rotor 51 onto the shaft 53, an unnecessary external force may be exerted on the rotor 51, and an undesirable mechanical stress may be generated on a surface of the rotor 51 toward which an armature is electromagnetically attracted. As a result, a magnetic attraction force on the surface of the rotor 51 may vary. In view of the above drawback, it is necessary to mount the rotor 51 onto the shaft 53 with an utmost care, which may further make the assembling operation cumbersome.

SUMMARY OF THE INVENTION

In view of the above, an object of the present invention is to provide an electromagnetic clutch having a structure that enables to simplify the assembling operation of the electromagnetic clutch.

According to an aspect of this invention, an electromagnetic clutch comprises: a rotatable shaft; a field coil having an energizing coil mounted on the shaft; an output-side rotary member formed with a through hole which is non-rotatably mounted on the shaft on a side opposing to the field coil; an input-side rotary member which is rotatably mounted on the shaft; a drive transmitting member which is rotatable together with the input-side rotary member for transmitting a drive power from the input-side rotary member to the output-side rotary member; and an elastic member for allowing the drive transmitting member to shift from the input-side rotary member side to the output-side rotary member side when the energizing coil is energized, wherein a cross section of the shaft and a cross section of the through hole of the output-side rotary member at respective mutually contacting surfaces are so configured that the shaft is capable of moving in and out of the through hole of the output-side rotary member without substantially deforming the mutually contacting surfaces between the shaft and the output-side rotary member.

In this arrangement, the output-side rotary member is mounted onto the shaft in a relative non-rotatable state by merely inserting the shaft into the through hole of the output-side rotary member. Accordingly, a press-fitting or swaging operation, which has been required in assembling the electromagnetic clutch of prior art, becomes unnecessary, thereby simplifying the assembling operation. Further, since the press-fitting or swaging is not necessary in this arrangement, the output-side rotary member is free from an undesirable external stress which may result in a mechanical distortion of the output-side rotary member, thus preventing occurrence of magnetic attraction force variation which may adversely affect a performance of the drive transmitting member.

These and other objects, features, aspects, and advantages of the present invention will become more apparent from the following detailed description of the preferred embodiments/examples.

BRIEF DESCRIPTION OF THE DRAWINGS

FIGS. 3A to 3C are diagrams each showing part constituting the electromagnetic clutch in which

FIGS. 5A to 5C are diagrams showing the electromagnetic clutch as an altered form in which FIGS. 6A to 6C are diagrams showing the electromagnetic clutch as still another form in which FIGS. 7A to 7C are diagrams showing the electromagnetic clutch as yet another form in which FIGS. 8A to 8C are diagrams showing the electromagnetic clutch as still another form in which FIGS. 9A to 9C are diagrams showing the electromagnetic clutch as yet another form in which FIGS. 10A to 10C are diagrams showing the electromagnetic clutch as a further form in which FIGS. 11A to 11C are diagrams showing the electromagnetic clutch as still another form in which FIGS. 12A to 12C are diagrams showing the electromagnetic clutch as yet another form in which FIGS. 13A to 13C are diagrams showing the electromagnetic clutch as still another form in which FIGS. 14A to 14C are diagrams showing the electromagnetic clutch as yet another form in which FIGS. 15A to 15C are diagrams showing the electromagnetic clutch as a further form in which

DESCRIPTION OF THE PREFERRED EMBODIMENTS

Figure 1:
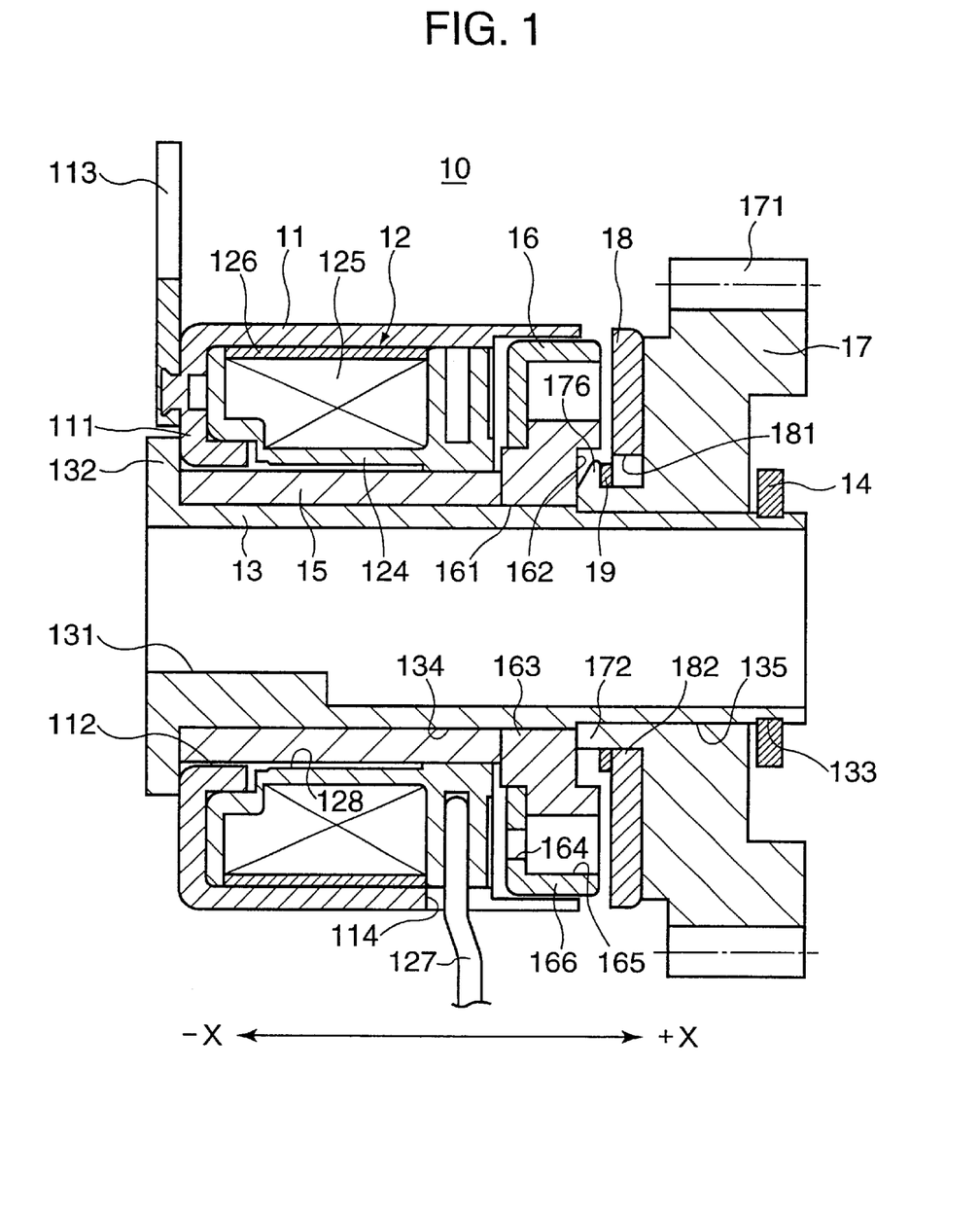
FIG. 1 is a cross-sectional view of an electromagnetic clutch according to an embodiment of this invention.
Figure 2:
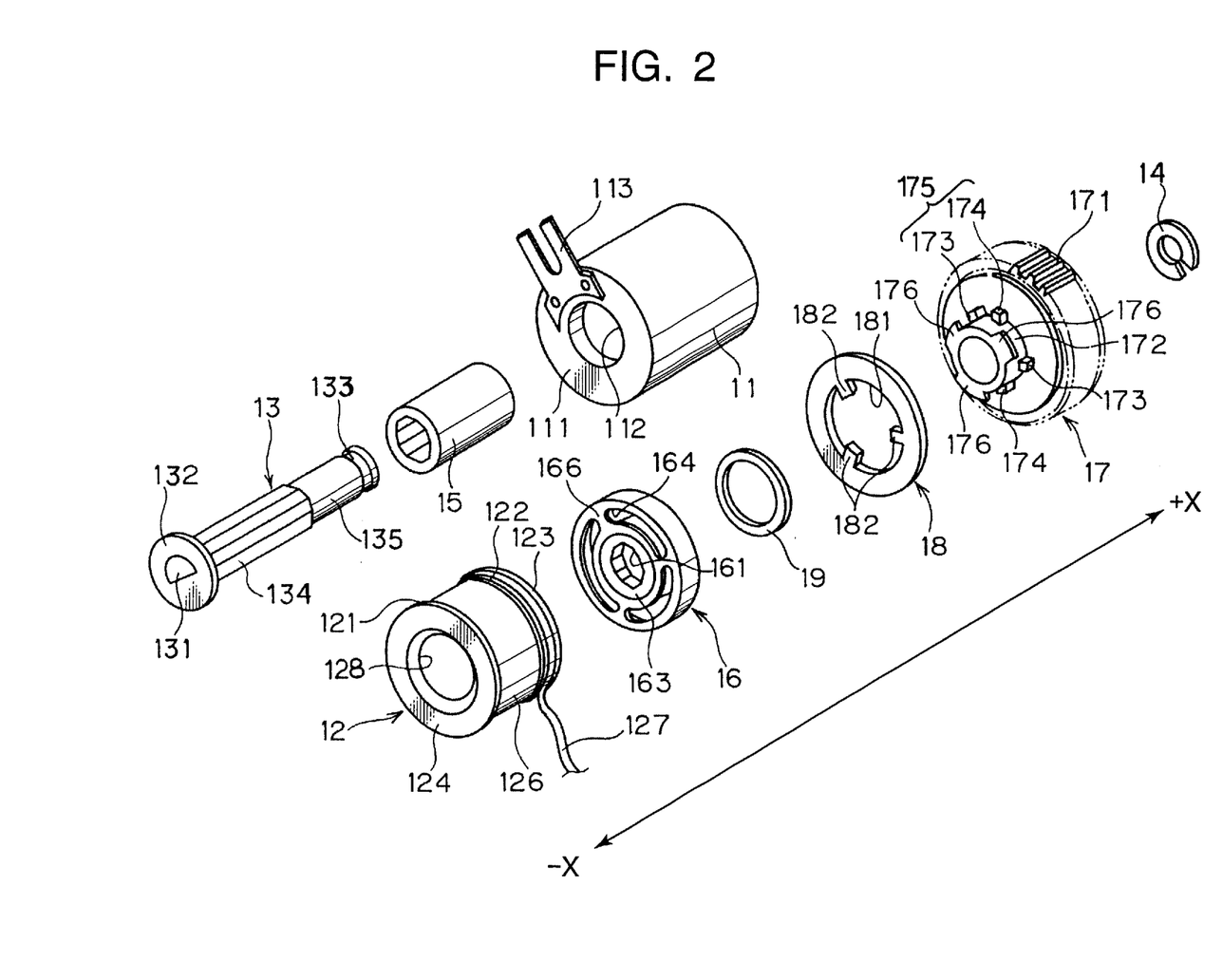
FIG. 2 is an exploded perspective view of the electromagnetic clutch.

FIG. 1 is a cross-sectional view of an electromagnetic clutch embodying this invention, and FIG. 2 is an exploded perspective view of the electromagnetic clutch. An electromagnetic clutch 10 has a housing (field) 11. A bottom part 111 of the housing 11 is formed with a through hole 112 substantially in the middle thereof, and a rotation stopper 113 extending radially outwardly is fixed on the bottom part 111. The housing 11 is made of a magnetized material such as ferrite metal, and is formed with a notch 114 (see FIG. 1) through which a wire 127 of an energizing coil 12 is drawn outside.

The energizing coil 12 is unmovably housed in the housing 11. The energizing coil 12 is constructed in such a manner that a bobbin 124 is formed with three flanges 121, 122, 123 and that a lead wire 127 is wound around the bobbin 124 over the area between the flanges 121 and 122. The area of the bobbin 124 where the lead wire is wound between the flanges 121 and 122 constitutes a coil section 125 of the energizing coil 12. An insulating sheet 126 shields around the outer surface of the coil section 125, and the opposite ends of the wire 127 exposing out of the insulating sheet 126 are fixed between the flanges 122, 123 and drawn outside through the notch 114 of the housing 11. Note that a through hole 128 extending in an axial direction of the bobbin 124 has substantially the same diameter as that of the through hole 112 of the housing 11.

A shaft 13 is rotatably inserted in the through hole 128 of the energizing coil 12 that is housed in the housing 11. The shaft 13 is made from a resin molding. The shaft 13 is formed with a through hole 131 extending axially to insert an external shaft (not shown), a flange 132 at an axial end thereof which is brought into contact with the outer surface of the bottom part 111 of the housing 11, and an annular groove 133 along an outer perimeter at the opposite end of the shaft 13.

A ring-shaped engaging member 14 such as a washer is fitted in the annular groove 133. A tubular casing 15 made of a magnetized material such as ferrite metal is mounted on the outer circumference of the shaft 13. The tubular casing 15 in cooperation with the housing 11 establishes a flux of magnetic induction when the energizing coil 12 is excited, which is described below in detail.

Figure 3A:
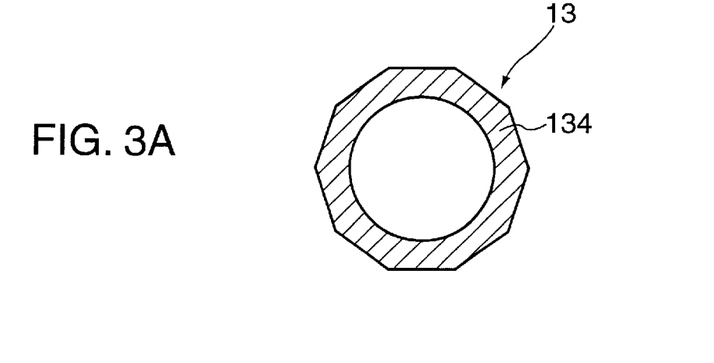
FIG. 3A is a cross-sectional view of a shaft.

The through hole 131 of the shaft 13 has a substantially D-shape as viewed from the left side in FIG. 2 (on the plane orthogonal to the axial direction of the shaft 13) to prevent a relative rotation of the external shaft to the shaft 13. The outer circumference of the shaft 13 has a substantially regular decagonal shape in cross section on the plane orthogonal to the axial direction of the shaft 13 partially, as shown in FIG. 3A, over an area from the location where the flange 132 is formed to a location slightly beyond the axially intermediate position toward the opposite end of the shaft 13 to prevent a relative rotation of the shaft 13 to the tubular casing 15. The part corresponding to the regular decagonal shape of the shaft 13 constitutes an engaging portion 134. The tubular casing 15 and a rotor 16, which is described below, are mounted on the engaging portion 134. A mounting portion 135 is formed on the shaft 13 over an area axially adjacent to the engaging portion 134 to mount a gear 17, which is described below.

Figure 3B:
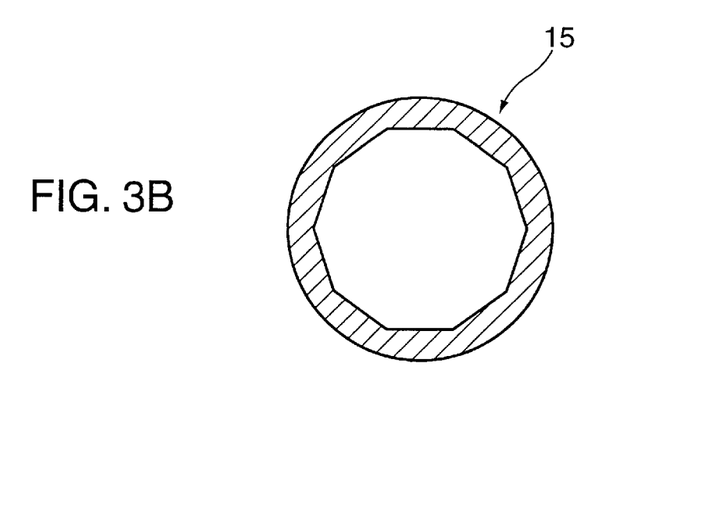
FIG. 3B is a cross-sectional view of a tubular casing.

An inner circumference of the tubular casing 15 is formed with a substantially regular decagonal shape in cross-section on the plane orthogonal to the axial direction of the tubular casing 15, as shown in FIG. 3B, to match with the regular decagonal shape of the engaging portion 134 of the shaft 13. The shaft 13 is inserted into the tubular casing 15 from the end opposite to the flange 132 (namely, on the end of the shaft 13 where the annular groove 133 is formed) to such an extent that the flange 132 of the shaft 13 abuts against the outer surface of the bottom part 111 of the housing 11 and fixed thereat.

The tubular casing 15 has an outer diameter slightly smaller than the diameter of the through hole 128 of the bobbin 124, and a length generally equal to the sum of the thickness of the bottom part 111 of the housing 11 and the length of the bobbin 124. A small clearance between the tubular casing 15 and the shaft 13 may be allowed so far as the tubular casing 15 is mountable on the shaft 13 in a relative non-rotatable state (namely, rotation of the tubular casing 15 about the axis of the shaft 13 is disabled).

As shown in FIG. 2, the energizing coil 12, the rotor 16, a ring member 19, an armature 18, and the gear 17 are assembled on the shaft 13 in the direction of +X in this order. Hereinafter, the side on which the part is mounted is shown by −X side or +X side.

The rotor 16 (output-side rotary member) is mounted on the shaft 13 on +X side of the energizing coil 12 in such a manner that the outer circumference thereof opposes the inner circumference of the housing 11. In FIG. 1, part of the rotor 16 is projected in +X direction from an axial end of the housing 11 in the drawing. However, any configuration of the rotor 16 may do as long as at least part of the rotor 16 opposes the inner circumference of the housing 11 in the axial direction on +X side.

The rotor 16 is made of a magnetized material such as ferrite metal. The rotor 16 is formed with a through hole 161 in a substantially middle thereof to insert the shaft 13, an inner annular section 163 which directly surrounds the through hole 161, a plurality of slits 164 (three through holes 164 in this embodiment) each extending along a circumference of the rotor 16 by a certain length, and an outer annular section 166 in the order of radially outwardly direction. The inner annular section 163 is formed with a recess 162 (see FIG. 1) on +X-side of the rotor 16 while the outer annular section 166 is formed with a recess 165 (see FIG. 1) on +X-side of the rotor 16.

Figure 3C:
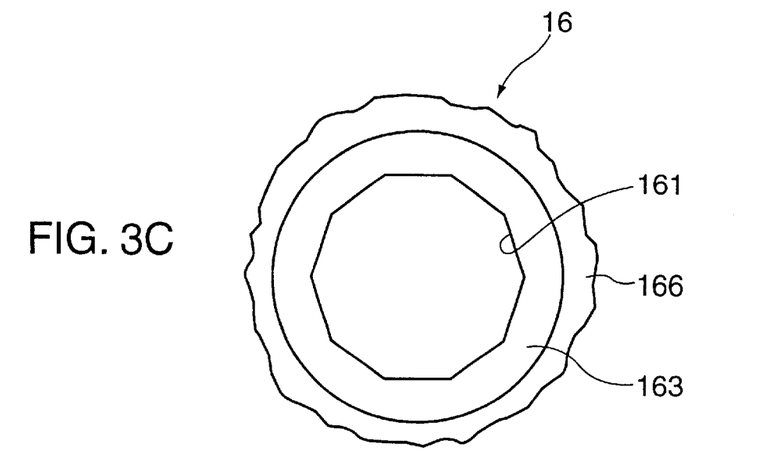
FIG. 3C is a front view showing essential parts of a rotor.

As shown in FIG. 3C, the inner circumference of the inner annular section 163 (namely, the contour of the through hole 161) has a substantially regular decagonal shape in cross-section on the plane orthogonal to the axial direction of the rotor 16 in conformity with the shape of the outer circumference of the engaging portion 134 of the shaft 13 to prevent a relative rotation of the shaft 13 to the rotor 16. Thus, the rotor 16 is non-rotatably mounted on the shaft 13 when the shaft 13 is inserted into the through hole 161 of the rotor 16.

Note that a clearance between the shaft 13 and the rotor 16 may be adequately set so far as the rotor 16 is non-rotatably mountable on the shaft 13.

The gear 17 (input-side rotary member) is mounted on the shaft 13 on +X side of the rotor 16 to be rotatable about the axis of the shaft 13. The gear 17 is, for instance, made from molding a resin. A number of teeth 171 are equidistantly formed along the outer circumference of the gear 17, and a tubular part 172 axially extending toward the rotor 16 is formed at a substantially middle of the gear 17. The tubular part 172 is formed with a through hole to insert the shaft 13. The rotor 16 is fitted on the tubular part 172 to such an extent that a lead end of the tubular part 172 is abutted against the bottom surface of the recess 162 of the rotor 16.

A plurality of position restrainers 175 (three in this embodiment) each consisting of position restricting projections 173, 174 are provided along the outer circumference of the tubular part 172 equidistantly. Each projection 173 (174) radially projects outward on the circumferential surface of the tubular part 172. The projection 173 (174) has a thickness in the axial direction of the shaft 13 slightly greater than the thickness of the armature 18, and the space between each pair of projections 173, 174 is set slightly larger than the width of a projection 182 of the armature 18, which is described below.

A radially extending slip stopper projection 176 is formed at an axially lead end on an outer periphery of the tubular part 172 at a position corresponding to a space between the adjacent position restrainers 175. Since there are three position restrainers 175 in this embodiment, three slip stopper projections 176 are formed on the gear 17 in this embodiment. The axial space between the slip stopper projection 176 and the projection 173 (174) is set substantially the same as the thickness of the ring member 19 which is described below. The slip stopper projection 176 has a surface inclined away from the rotor 16 as radially outwardly extending from the outer periphery of the tubular part 172.

The generally ring-shaped armature 18 (as a drive transmitting member) is provided on −X side of the gear 17 in such a manner that a through hole 181 having a diameter larger than that of the cylindrical portion of the tubular part 172 is formed in the middle to be mounted on the tubular part 172. The armature 18 is made of a magnetized material such as ferrite metal. The outer diameter of the armature 18 is set generally the same as that of the rotor 16, and the radially inwardly protruding projections 182 (three projections 182 in this embodiment) are circumferentially formed along the perimeter of the through hole 181 at a certain interval. Each projection 182 is fitted in the clearance defined by the corresponding pair of projections 173, 174 and, thus, the armature 18 has its free rotation restricted by the above construction of the gear 17 and is enabled to rotate with the gear 17.

The ring member 19 (as an elastic member) is fitted in the space defined by the position restrainers 175 and the stopper projections 176 of the tubular part 172. The ring member 19 is made of an elastic polymer such as synthetic resin including polyester and rubber, with its inner diameter slightly larger than the outer diameter of the tubular part 172 and its outer diameter smaller than the diameter of the through hole 181 of the armature 18. The ring member 19 is adapted to prevent falling off of the armature 18 from the gear 17 due to resilient contact of the projections 182 with the ring member 19 even if the armature 18 is urged away from the gear 17 toward the rotor 16 when the energizing coil 12 is excited. The ring member 19 is first set on the inclined surface (slope) of the slip stopper projections 176, and is pushed toward the gear 17 in such a manner as to expand radially while climbing over the slope of the projections 176 as the ring member 19 is resiliently deformed, and then, the ring member 19 is seated on the tubular part 172 between the slip stopper projections 176 and the position restrainers 175.

Finally, the ring-shaped engaging member 14 (engaging means) such as a washer is fitted in the annular groove 133 of the shaft 13. The flange 132 of the shaft 13 in cooperation with the engaging member 14 secures positioning of the above-mentioned parts of the electromagnetic clutch 10 on the shaft 13.

The electromagnetic clutch 10 having the above construction is, for example, mounted on a sheet feed mechanism of an image forming apparatus such as a copier in the following manner. An output shaft of the sheet feed mechanism is inserted in the D-shaped through hole 131 of the shaft 13 in such a state that the rotation stopper 113 of the housing 11 is engaged with a fixing member provided in a main body of the image forming apparatus so that the housing 11 is set non-rotatable relative to the output shaft. In this state, when a rotating force of an external power source is transmitted to the gear 17, the gear 17 is rotated in cooperation with the armature 18 about the axis of the shaft 13.

Figure 4:
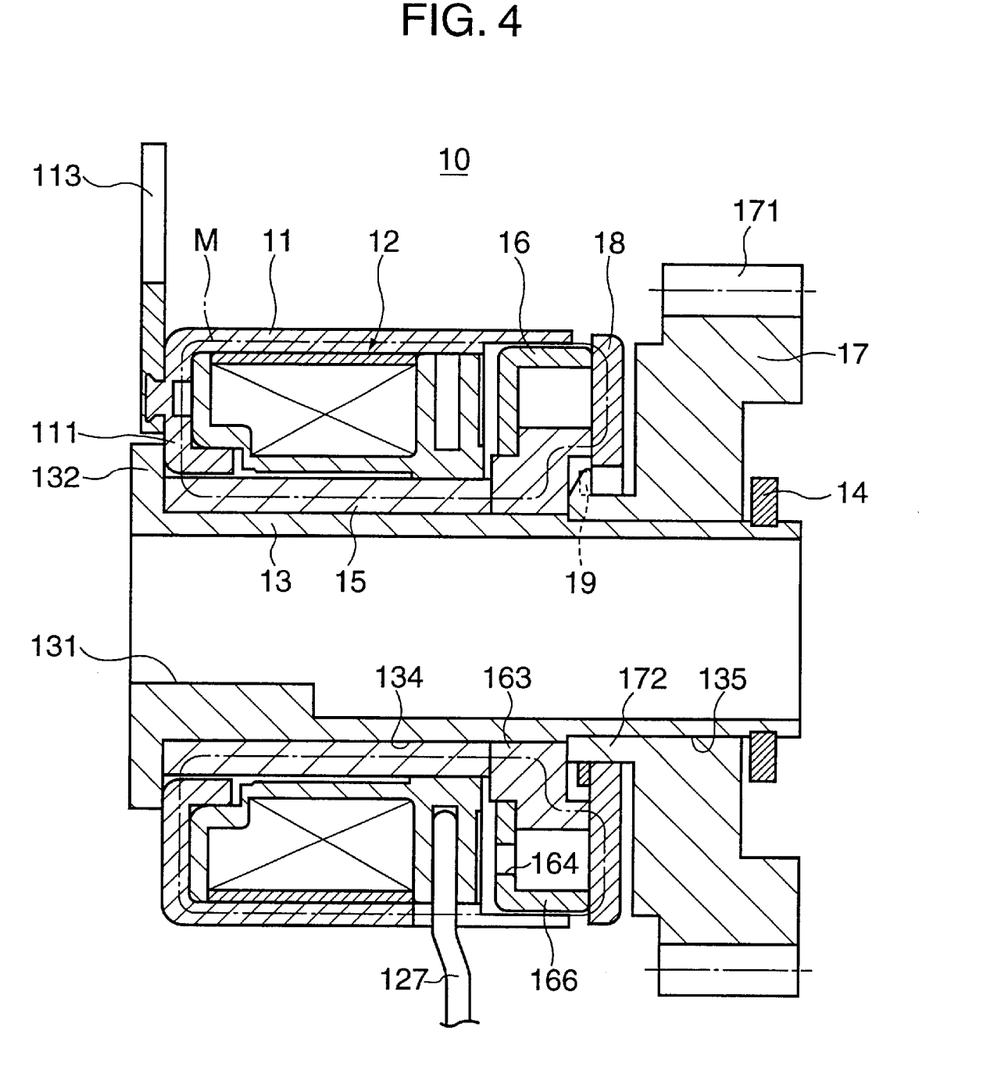
FIG. 4 is a cross-sectional view illustrating an operation of the electromagnetic clutch.

Then, when the energizing coil 12 is excited (namely, a current flows through the wire 127), electromagnetic induction generates, and a flux of electromagnetic induction (magnetic flux) generates in the assembled parts of the housing 11, tubular casing 15, and rotor 16. In the arrangement of the inventive electromagnetic clutch, an electromagnetic resistance in the rotor 16 increases due to the existence of the through holes (slits) 164. As a result, the magnetic flux passes via the armature 18 in the vicinity of the rotor 16. As a result, a magnetic attraction force to draw the armature 18 toward the rotor 16 generates around the armature 18, and, as shown in FIG. 4, the armature 18 is magnetically attracted to the rotor 16 against a resilient force of the ring member 19. Note that the broken line indicated by M in FIG. 4 denotes a line of electromagnetic induction which is generated in the electromagnetic clutch 10 via the armature 18.

More specifically, when the armature 18 is magnetically attracted to the rotor 16 by the magnetic flux generated in the electromagnetic clutch 10, the ring member 19 is resiliently deformed toward the rotor 16 with its portions corresponding to the projections 182 of the armature 18 pushing the rotor 16 in −X direction. Thereby, the armature 18 is securely attracted to the rotor 16 against the resilient force of the ring member 19, and consequently, the rotor 16 is rotated together with the armature 18, thereby transmitting the rotating force of the gear 17 to the shaft 13 to rotate the shaft 13 followed by rotation of the gear 17.

On the other hand, when the energizing coil 12 is deenergized (namely, current flow to the wire 127 is ceased), the magnetic flux M is gone, and accordingly the magnetic attraction force which has magnetically attracted the armature 18 to the rotor 16 is gone. Thereby, the pressing force of the armature 18 to press the ring member 19 toward the rotor 16 is released. As the pressing force is released, the ring member 19 which has been resiliently deformed while the energizing coil 12 has been excited returns to the original state due to its restoring force, and allows the armature 18 to set back to the original position away from the rotor 16. Thus, the transmission of the rotating force of the gear 17 to rotate the shaft 13 is cut off, and the rotation of the shaft 13 is suspended.

In the embodiment, the electromagnetic clutch 10 is constructed such that the rotor 16 and the shaft 13 are enabled to rotate together by fitting the engaging portion 134 of the shaft 13 having the configuration of regular decagonal-shape into the through hole 161 of the rotor 16 having the contour of regular decagonal-shape. This arrangement enables to omit a press-fitting or swaging operation which has been required in the conventional electromagnetic clutch and simplifies the assembling operation of the electromagnetic clutch.

Further, in this arrangement, the rotor 16 is free from an unnecessary external force which has been inevitably exerted in the conventional electromagnetic clutch. This arrangement provides enhanced reliability to the electromagnetic clutch because there is no possibility, as having been involved in the conventional electromagnetic clutch, that a mechanical stress may be exerted on the surface of the rotor which may result in magnetic attraction force variation of the electromagnetic clutch. Furthermore, the simplified assembling operation contributes to cost reduction in an assembling facility. Namely, since the mounting operation of the rotor 16 to the shaft 16 is easy, the electromagnetic clutch can be produced with a low cost.

The electromagnetic clutch according to this invention is not limited to the one shown in the embodiment but various modifications and alterations as described below are applicable.

(1) In the embodiment, the shaft 13 is made of a resin, a non-magnetized material. The shaft may be produced by machining a metallic shaft made of a magnetized material into a specified shape, or molding magnetized powder material into a certain shape and sintering the same. In the case where the shaft 13 is made of a magnetized material, a magnetic flux generates in cooperation with the magnetized shaft 13. In this case, the tubular casing 15 for encasing the shaft 13 can be omitted. In the case where the shaft 13 is made of a non-magnetized material, the shaft 13 may be made of ceramics such as alumina. Particularly, in the case where the shaft 13 is made of a resin, production of shaft is feasible compared to the case where a shaft is produced by machining a metallic material, which contributes to production cost reduction of the electromagnetic clutch as a whole.

(2) In the embodiment, the engaging portion 134 of the shaft 13 has the outer circumferential contour of a sectionally regular decagonal shape, and the inner circumference of the tubular casing 15 and the contour of the through hole 161 (innermost surface of the rotor 16) each has a sectionally regular decagonal shape which substantially matches with the contour of the engaging portion 134 to prevent a relative rotation of the rotor 16 to the shaft 13. The above configuration may be of a regular polygonal shape having three or more sides. In the case where the configuration has a regular decagonal shape as in the embodiment, mounting the rotor 16 and the tubular casing 15 on the engaging portion 134 of the shaft 13 and angularly displacing the rotor 16 and the tubular member 15 relative to the shaft 13 at 18 degrees circumferentially at maximum enables to mount the rotor 16 non-rotatably onto the shaft 13. Thus, the fitting operation is simplified.

In place of the regular decagonal shape, an irregular polygonal shape in which one side has a different length from the other may be applicable. In this case, mounting operation including adjustment of the relative position of the parts becomes slightly cumbersome compared to the former case where the parts each have a regular polygonal shape. However, the latter mounting operation does not involve any particular inconvenience by roughly determining the relative position of the parts with direct visual observation. Also, the polygonal shape may include a curve on the side or on the corner thereof.

So far as the rotor 16 is non-rotatably mountable on the shaft 13 and it does not necessitate the deformation on the mutually contacting surfaces between the shaft 13 and the rotor 16 during the rotor mounting step, the shaft 13, the tubular casing 15 and the rotor 16 may each have such a contour other than the polygonal shape, as depicted in FIGS. 5A to 15C. In the drawings of FIGS. 5A to 15C, drawings labeled with FIG. number "A" show a cross-sectional shape of the shaft 13 as an altered form, drawings labeled with FIG. number "B" show a cross sectional shape of the tubular casing 15 as an altered form, and drawings labeled with Figure number "C" show a front view of the essential parts of the rotor 16 as an altered form. Note that the inner circumferential contour of the tubular casing 15 in each drawing is generally the same as that of the engaging portion 134 of the shaft 13 in the corresponding drawing. Likewise, the through hole 161 of the rotor 16 shown in each drawing has generally the same shape as the engaging portion 134 of the shaft 13 in the corresponding drawing. In any case, the shaft 13 is integrally rotatable with the rotor 16 by merely inserting the shaft 13 in the tubular casing 15 and mounting the rotor 16 on the engaging portion 134 of the shaft 13. This arrangement enables to omit a press-fitting or swaging operation which has been required in assembling the conventional electromagnetic clutch, and simplifies the assembling operation of the electromagnetic clutch.

Since the electromagnetic clutch according to this invention is based on the arrangement that the contour of the engaging portion 134 of the shaft 13 substantially matches with the corresponding shape of the tubular casing 15 and the rotor 16, varied contours of these parts are representatively described with respect to the shaft 13 hereinafter.

Figure 5A:
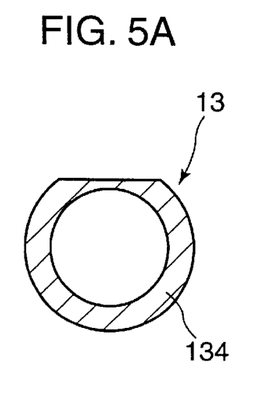
FIG. 5A is a cross-sectional view of a shaft.
Figure 6A:
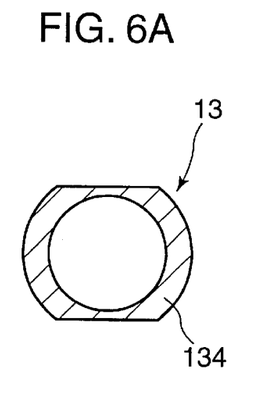
FIG. 6A is a cross-sectional view of a shaft.
Figure 6B:
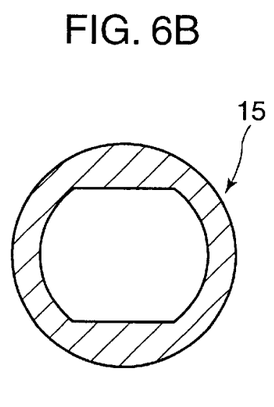
FIG. 6B is a cross-sectional view of a tubular casing.
Figure 6C:
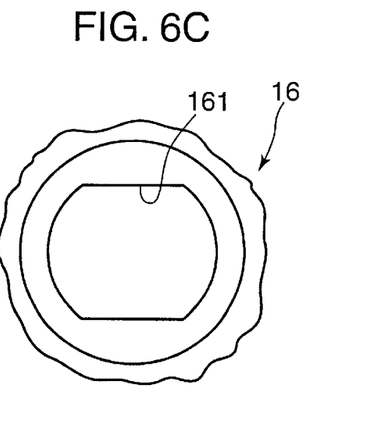
FIG. 6C is a front view showing essential parts of a rotor.
Figure 7A:
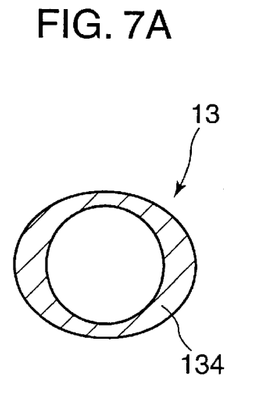
FIG. 7A is a cross-sectional view of a shaft.
Figure 7B:
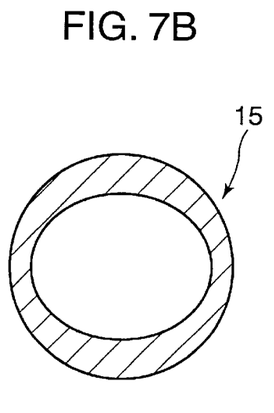
FIG. 7B is a cross-sectional view of a tubular casing.
Figure 7C:
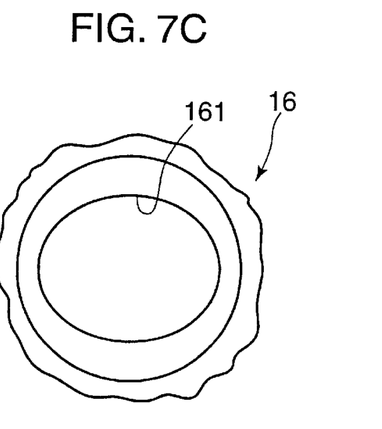
FIG. 7C is a front view showing essential parts of a rotor.

In FIG. 5A, the outer circumference of the engaging portion 134 of the shaft 13 has a substantially D-shape in cross section w consisting of a circular arc and a straight line (namely, a combination of a curved portion and a flat surface). In FIG. 6A, the outer circumference of the engaging portion 134 of the shaft 13 has a contour combining two flat planes in parallel and two circular arc portions juxtaposed each other. In FIG. 7A, the outer circumference of the engaging portion 134 of the shaft 13 is elliptical in cross section.

Figure 8A:
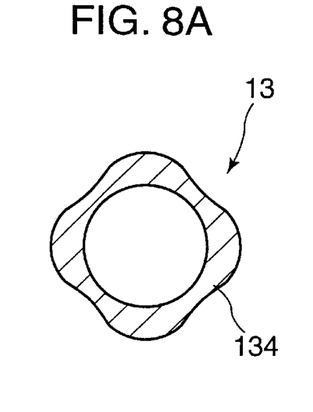
FIG. 8A is a cross-sectional view of a shaft.
Figure 8B:
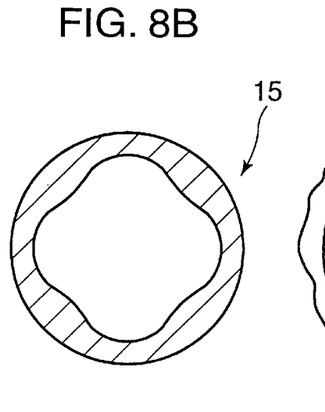
FIG. 8B is a cross-sectional view of a tubular casing.
Figure 8C:
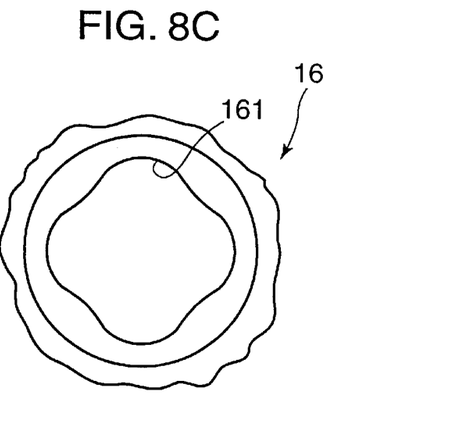
FIG. 8C is a front view showing essential parts of a rotor.
Figure 9A:
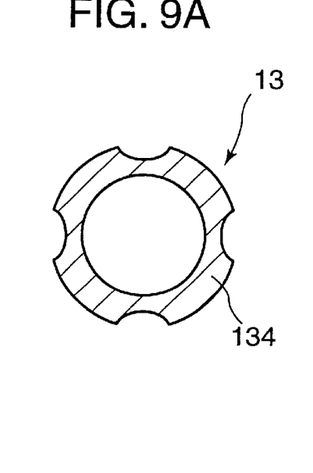
FIG. 9A is a cross-sectional view of a shaft.
Figure 9B:
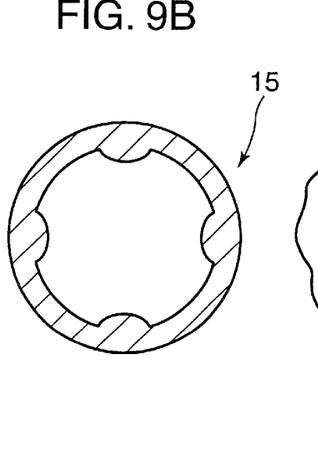
FIG. 9B is a cross-sectional view of a tubular casing.
Figure 9C:
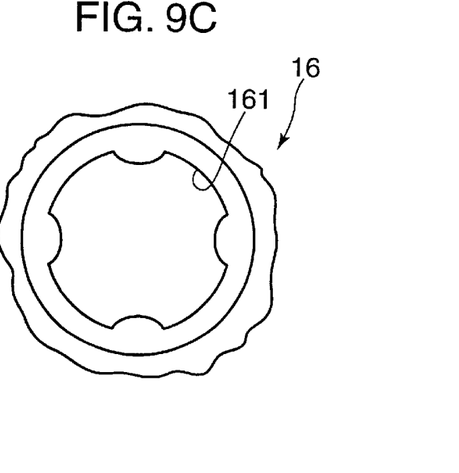
FIG. 9C is a front view showing essential parts of a rotor.
Figure 10A:
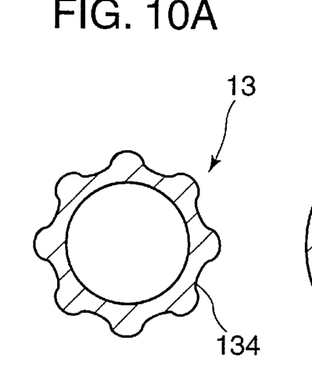
FIG. 10A is a cross-sectional view of a shaft.
Figure 10B:
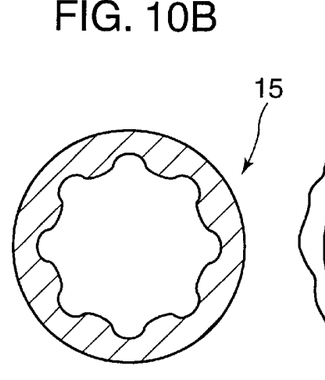
FIG. 10B is a cross-sectional view of a tubular casing.
Figure 10C:
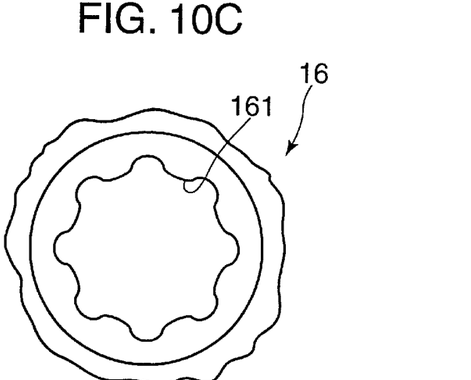
FIG. 10C is a front view showing essential parts of a rotor.

In FIG. 8A, the outer circumference of the engaging portion 134 of the shaft 13 is formed with four bulging portions in series each having a circular arc portion and disposed equidistantly along the perimeter of the shaft 13 in which the radii of curvature of the bulging portions are generally the same with each other. In FIG. 9A, the outer circumference of the engaging portion 134 of the shaft 13 is formed with four indents each having a circular arc and disposed equidistantly along the perimeter thereof. In FIG. 10A, the outer circumference of the engaging portion 134 of the shaft 13 is formed with eight projections and eight recesses equidistantly and alternately along the perimeter thereof in which the projection has a greater radius of curvature than that of the recess. Note that what is disclosed in FIGS. 8A to 10A exemplifies the configuration that projections and recesses are alternately formed along the outer circumference of the engaging portion 134 of the shaft 13.

Figure 11A:
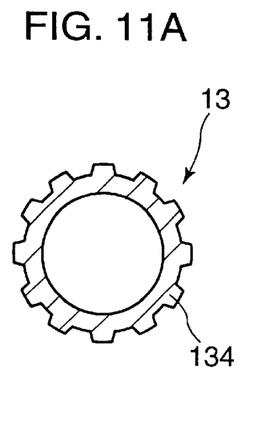
FIG. 11A is a cross-sectional view of a shaft.
Figure 11B:
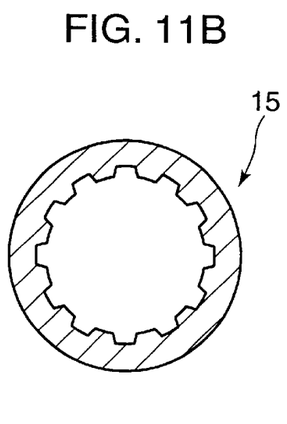
FIG. 11B is a cross-sectional view of a tubular casing.
Figure 11C:
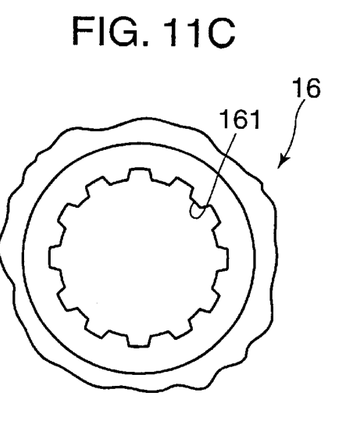
FIG. 11C is a front view showing essential parts of a rotor.
Figure 12A:
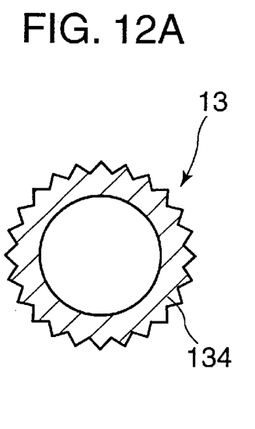
FIG. 12A is a cross-sectional view of a shaft.
Figure 12B:
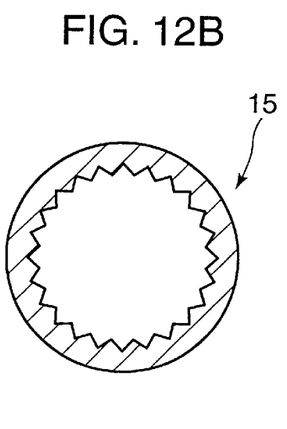
FIG. 12B is a cross-sectional view of a tubular casing.
Figure 12C:
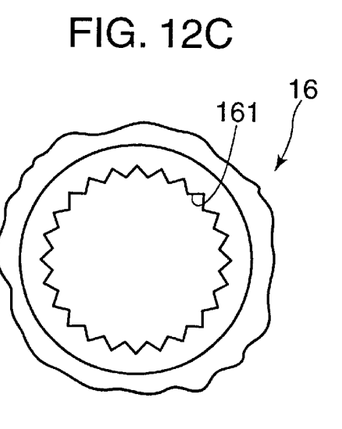
FIG. 12C is a front view showing essential parts of a rotor.
Figure 13A:
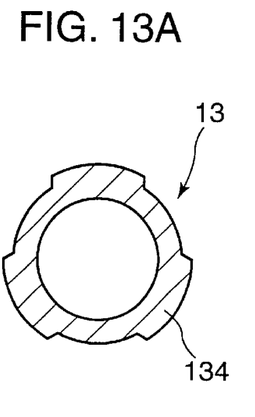
FIG. 13A is a cross-sectional view of a shaft.
Figure 13B:
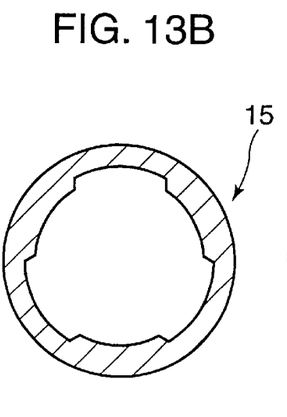
FIG. 13B is a cross-sectional view of a tubular casing.
Figure 13C:
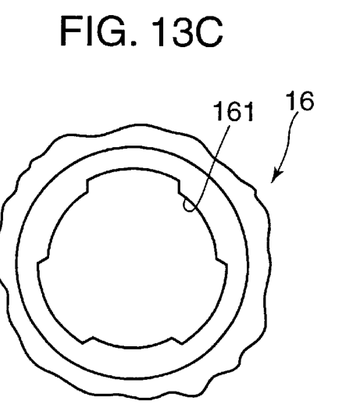
FIG. 13C is a front view showing essential parts of a rotor.
Figure 14A:
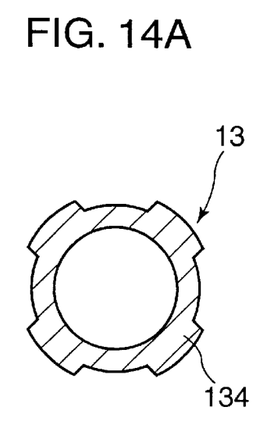
FIG. 14A is a cross-sectional view of a shaft.
Figure 14B:
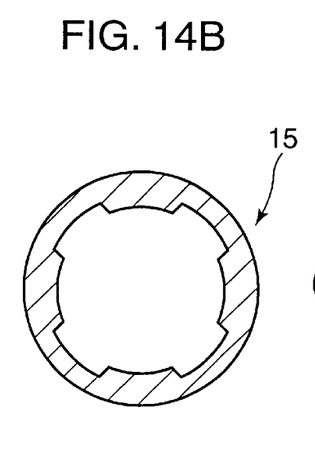
FIG. 14B is a cross-sectional view of a tubular casing.
Figure 14C:
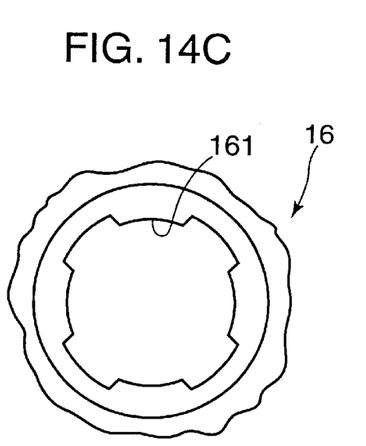
FIG. 14C is a front view showing essential parts of a rotor.

In FIG. 11A, the outer circumference of the engaging portion 134 of the shaft 13 is formed with twelve projections and twelve indents equidistantly and alternately along the perimeter thereof in which the projection and the indent have the same dimensions with each other. In FIG. 12A, the outer circumference of the engaging portion 134 of the shaft 13 is formed with twenty four triangular projections (serrated teeth) in series along the perimeter thereof. In FIG. 13A, the outer circumference of the engaging portion 134 of the shaft 13 is formed with three arc shape projections 134 and three recessed portions alternately and equidistantly along the perimeter thereof in which the radius of the arc shape projection is larger than that of the recessed portion. In FIG. 14A, the outer circumference of the engaging portion 134 of the shaft 13 is formed with four arc shape projections and four recessed portions alternately and equidistantly along the perimeter thereof in which the radius of the arc shape projection is larger than that of the recessed portion. Note that what is disclosed in FIGS. 11A to 14A exemplifies the configuration that projections and recesses are formed alternately along the outer circumference of the engaging portion 134 of the shaft 13, similar to the configuration of FIGS. 8A to 10A.

Figure 15A:
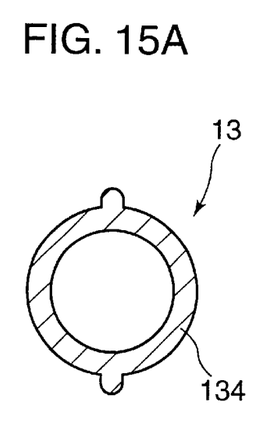
FIG. 15A is a cross-sectional view of a shaft.
Figure 15B:
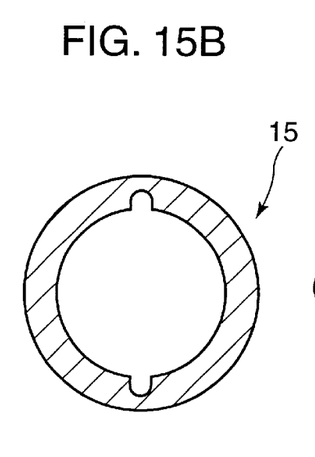
FIG. 15B is a cross-sectional view of a tubular casing.
Figure 15C:
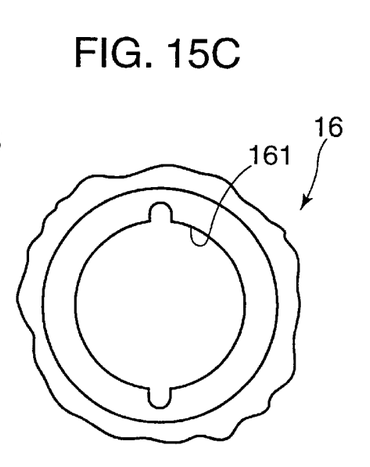
FIG. 15C is a front view showing essential parts of a rotor.

In FIG. 15A, the outer circumference of the engaging portion 134 of the shaft 13 is formed with two projections opposing each other radially with a round curve on a protruding end. The engaging portion 134 in FIG. 15A may have one projection or more than two projections. In other words, as long as the outer circumference of the engaging portion 134 of the shaft 13 has at least one projection, such configuration may equivalently function as the shaft 13 shown in FIG. 3A.

It is not necessary to shape the inner circumference of the tubular casing 15 and the contour of the through hole 161 of the rotor 16 in conformity with the outer shape of the engaging portion 134 of the shaft 13. As far as the rotor 16 is kept non-rotatable relative to the shaft 13 when the tubular casing 15 and the rotor 16 are mounted on the shaft 13 (namely, the inner circumference of the rotor 16 has such a shape as to match with the outer shape of the shaft 13), the inner circumference of the tubular casing 15 and the rotor 16 may take any shape.

Figure 5B:
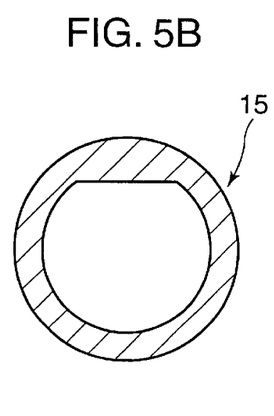
FIG. 5B is a cross-sectional view of a tubular casing.
Figure 5C:
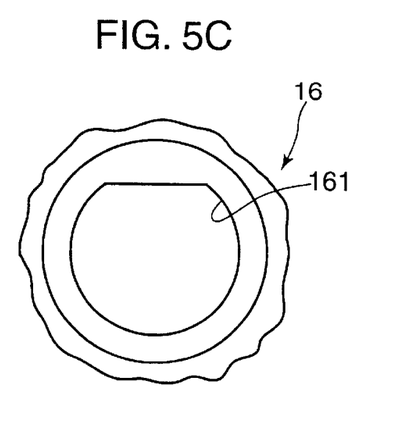
FIG. 5C is a front view showing essential parts of a rotor.
Figure 16:
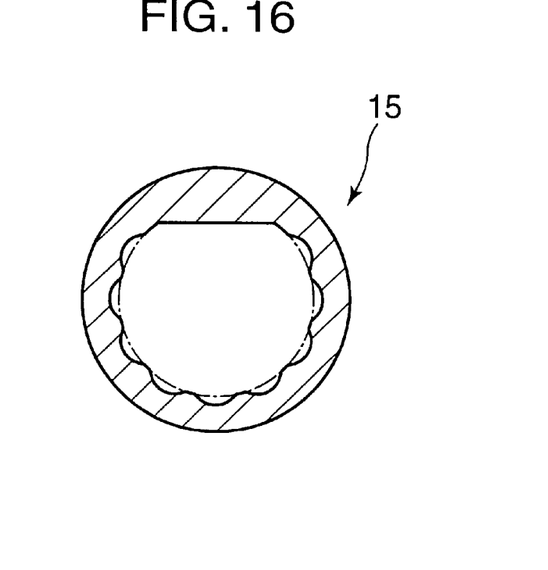
FIG. 16 is a diagram showing a modified form of the tubular casing shown in FIG. 5B.
Figure 17:
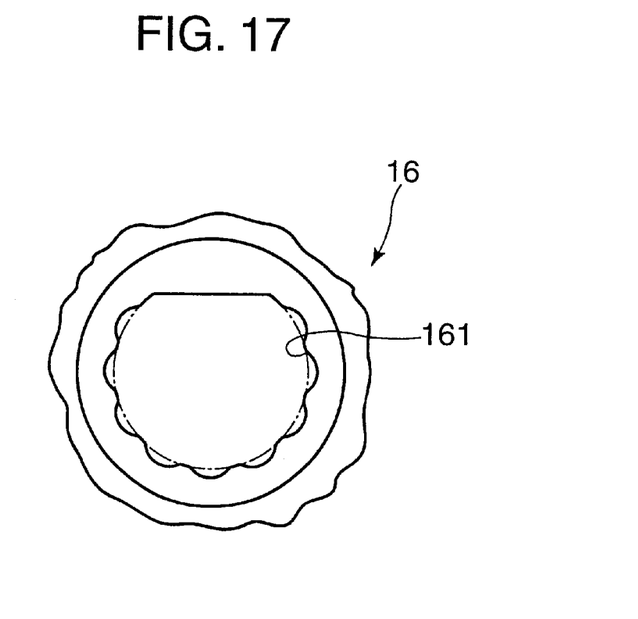
FIG. 17 is a diagram showing a modified form of the rotor shown in FIG. 5C.

For instance, when taking the examples of FIGS. 5B and 5C respectively depicting the tubular casing 15 and the rotor 16, the inner circumferences of the tubular casing 15 and the rotor 16 may have the configurations shown in FIGS. 15 and 16 respectively in which the circular arc is shaped into a series of scallops. The same configuration is applied to the outer circumference of the engaging portion 134 of the shaft 13.

(3) In the embodiment, the armature 18 is disposed between the rotor 16 and the gear 17, and is set rotatable together with the gear 17. Alternatively, the armature 18 may be disposed between the rotor 16 and the energizing coil 12. In this case, also, it is possible to assemble the electromagnetic clutch 10 in such a manner that the armature 18 is rotatable with the gear 17.

(4) In the embodiment, when the energizing coil 12 is not excited, the armature 18 is urged toward the gear 17 due to the resilient force of the ring member 19 to prevent falling off of the armature 18 from the gear 17. Alternatively, the armature 18 may be urged toward the gear 17 and so mounted on the gear 17 due to a spring force of a plate spring. In this case, the slip stopper projections 176 may be omitted. As an altered form, the ring member 19 may be made of a metallic thin plate, in place of the polymer having elasticity.

To sum up this invention, according to an aspect of this invention, an electromagnetic clutch comprises: a rotatable shaft; a field coil having an energizing coil mounted on the shaft; an output-side rotary member formed with a through hole which is non-rotatably mounted on the shaft on a side opposing to the field coil; an input-side rotary member which is rotatably mounted on the shaft; a drive transmitting member which is rotatable together with the input-side rotary member for transmitting a drive power from the input-side rotary member to the output-side rotary member; and an elastic member for allowing the drive transmitting member to shift from the input-side rotary member side to the output-side rotary member side when the energizing coil is energized; a cross section of the shaft and a cross section of the through hole of the output-side rotary member at respective mutually contacting regions are so configured that the shaft is capable of moving in and out of the through hole of the output-side rotary member without substantially deforming mutually contacting surfaces between the shaft and the output-side rotary member.

With this arrangement, the output-side rotary member is mounted onto the shaft in a relative non-rotatable state by merely inserting the shaft into the through hole of the output-side rotary member. Accordingly, a press-fitting or swaging operation, which has been required in assembling the electromagnetic clutch of prior art, is unnecessary, thereby simplifying the assembling operation of the electromagnetic clutch. Further, since the press-fitting or swaging is not necessary in this arrangement, the output-side rotary member is free from an undesirable external stress which may result in a mechanical distortion of the output side rotary member, thus preventing occurrence of magnetic attraction force variation which may adversely affect a performance of the drive transmitting member.

According to another aspect of this invention, the outer circumference of the shaft is configured into a polygonal shape in cross section.

With this arrangement, forming the inner circumference of the output-side rotary member with such a configuration as to match with the polygonal shape of the shaft to prevent relative rotation of the shaft to the output-side rotary member facilitates non-rotatable mounting of the output-side rotary member onto the shaft. Thereby, the assembling operation of the electromagnetic clutch is simplified.

According to yet another aspect of this invention, the contour of the through hole of the output-side rotary member is a polygon in cross section to match with the configuration of the outer circumference of the shaft.

With this arrangement, merely matching one side of the polygonal shape of the output-side rotary member with one side of the polygonal shape of the shaft facilitates non-rotatably mounting of the output-side rotary member onto the shaft. This arrangement contributes to simplified assembling operation of the electromagnetic clutch.

According to still another aspect of this invention, the polygon is a regular polygon.

This arrangement also facilitates non-rotatable mounting of the output-side rotary member onto the shaft, thereby simplifying the assembling operation of the electromagnetic clutch.

According to a further aspect of this invention, the outer circumference of the shaft is partially formed with a flat surface to keep the output-side rotary member non-rotatable to the shaft.

With this arrangement, forming the inner circumference of the output-side rotary member into such a configuration as to match with the flat surface of the shaft for preventing relative rotation facilitates non-rotatable mounting of the output-side rotary member onto the shaft, thereby simplifying the assembling operation of the electromagnetic clutch.

According to a still further aspect of this invention, the contour of the through hole of the output-side rotary member is such that a flat surface is partially formed to match with the configuration of the outer circumference of the shaft so as to keep the output-side rotary member non-rotatable to the shaft.

With this arrangement, simply matching the flat surface of the output-side rotary member with the flat surface of the shaft enables to non-rotatably mount the output-side rotary member onto the shaft with ease, thereby simplifying the assembling operation of the electromagnetic clutch.

According to another aspect of this invention, the outer circumference of the shaft is configured into an elliptical shape in cross section to keep the output-side rotary member non-rotatable to the shaft.

With this arrangement, forming the inner circumference of the output-side rotary member into such a shape as to match with the elliptical shape of the shaft facilitates non-rotatable mounting of the output-side rotary member onto the shaft, thereby simplifying the assembling operation of the electromagnetic clutch.

According to yet another aspect of this invention, the contour of the through hole of the output-side rotary member is an elliptical shape in cross section to match with the configuration of the outer circumference of the shaft so as to keep the output-side rotary member non-rotatable to the shaft.

With this arrangement, simply matching the elliptical shape of the output-side rotary member with the elliptical shape of the shaft enables to non-rotatably mount the output-side rotary member onto the shaft with ease, thereby simplifying the assembling operation of the electromagnetic clutch.

According to a still further aspect of this invention, the outer circumference of the shaft is formed with a projection and a recess alternately to keep the output-side rotary member non-rotatable to the shaft.

With this arrangement, forming the inner circumference of the output-side rotary member into such a configuration as to match with the projection and the recess of the shaft facilitates non-rotatable mounting of the output-side rotary member onto the shaft, thereby simplifying the assembling operation of the electromagnetic clutch.

According to yet another aspect of this invention, the contour of the through hole of the output-side rotary member is such that a projection and a recess respectively engageable with the recess and the projection of the outer circumference of the shaft are alternately formed so as to keep the output-side rotary member non-rotatable to the shaft.

With this arrangement, merely matching the recess and projection of the output-side rotary member with the corresponding projection and recess of the shaft facilitates non-rotatable mounting of the output-side rotary member onto the shaft, thereby simplifying the assembling operation of the electromagnetic clutch.

According to still another aspect of this invention, the outer circumference of the shaft is formed with at least one projection to keep the output-side rotary member non-rotatable to the shaft.

With this arrangement, forming the inner circumference of the output-side rotary member into such a shape as to match with the configuration of the shaft having at least one projection enables to non-rotatably mount the output-side rotary member onto the shaft with ease, thereby simplifying the assembling operation of the electromagnetic clutch.

According to a further aspect of this invention, the contour of the through hole of the output-side rotary member is such that a recess engageable with the projection of the outer circumference of the shaft is formed so as to keep the output-side rotary member non-rotatable to the shaft.

With this arrangement, simply matching the recess of the output-side rotary member with the projection of the shaft facilitates non-rotatable mounting of the output-side rotary member onto the shaft, thereby simplifying the assembling operation of the electromagnetic clutch.

According to yet another aspect of this invention, the electromagnetic clutch further comprises a tubular casing, wherein a flux of magnetic induction generates when the shaft is inserted in the tubular casing and the energizing coil is excited, an outer circumference of the shaft at a position for engaging with the tubular casing has a configuration generally identical to the configuration of the outer circumference of the shaft engageable with the output-side rotary member , and an inner circumference of the tubular casing is so configured as to keep the shaft non-rotatable to the tubular casing.

With this arrangement, since a non-magnetized material such as resin can be applied as a material for the shaft, it becomes easy to shape the outer circumference of the shaft capable of preventing relative rotation.

According to a still further aspect of this invention, the outer circumference of the shaft is formed with an engaging portion extending in an axial direction of the shaft to be non-rotatably engageable with the output-side rotary member and the tubular casing.

With this arrangement, the tubular casing and the output side rotary member can be engageably mounted on the engaging portion of the shaft which is continuously formed on the shaft at one end thereof. This configuration simplifies the assembling operation of the electromagnetic clutch.

According to yet another aspect of this invention, the shaft has a flange at one end thereof with the engaging portion formed near the one end to be insertable in the tubular casing from the opposite end thereof.

With this arrangement, the shaft is inserted in the tubular casing from one end opposite to the end where the flange is formed and has its insertion secured by abutment of the flange with the tubular casing. Thereby, positioning of the tubular casing relative to the shaft is secured.

According to still another aspect of this invention, the shaft is made of a resin.

This arrangement contributes to easy production of the shaft even if the shaft has a complex configuration.

The present invention has been described with reference to the present embodiments. Obviously, modifications and alterations will occur to others upon reading and understanding the proceeding detailed description. It is indeed that the present invention be construed as including all such modifications and alterations insofar as they come within the scope of the attended claims or the equivalents thereof.

What is claimed is:

1. An electromagnetic clutch comprising:

a rotatable shaft;

a field coil having an energizing coil mounted on the shaft;

an output-side rotary member formed with a through hole which is non-rotatably mounted on the shaft on a side opposing to the filed coil;

an input-side rotary member which is rotatably mounted on the shaft;

a drive transmitting member which is rotatable together with the input-side rotary member for transmitting a drive power from the input-side rotary member to the output-side rotary member; and an elastic member for allowing the drive transmitting member to shift from the input-side rotary member side to the output-side rotary member side when the energizing coil is energized;

a cross section of the shaft and a cross section of the through hole of the output-side rotary member at respective mutually contacting regions are so configured that the shaft is capable of moving in and out of the through hole of the output-side rotary member without substantially deforming mutually contacting surfaces between the shaft and the output-side rotary member.

2. The electromagnetic clutch according to claim 1, wherein the outer circumference of the shaft is configured into a polygonal shape in cross section.

3. The electromagnetic clutch according to claim 2, wherein the contour of the through hole of the output-side rotary member is a polygon in cross section to match with the configuration of the outer circumference of the shaft.

4. The electromagnetic clutch according to claim 2, wherein the polygon is a regular polygon.

5. The electromagnetic clutch according to claim 3, wherein the polygon is a regular polygon.

6. The electromagnetic clutch according to claim 1, wherein the outer circumference of the shaft is partially formed with a flat surface to keep the output-side rotary member non-rotatable to the shaft.

7. The electromagnetic clutch according to claim 6, wherein the contour of the through hole of the output-side rotary member is such that a flat surface is partially formed to match with the configuration of the outer circumference of the shaft so as to keep the output-side rotary member non-rotatable to the shaft.

8. The electromagnetic clutch according to claim 1, wherein the outer circumference of the shaft is configured into an elliptical shape in cross section to keep the output-side rotary member non-rotatable to the shaft.

9. The electromagnetic clutch according to claim 8, wherein the contour of the through hole of the output-side rotary member is an elliptical shape in cross section to match with the configuration of the outer circumference of the shaft so as to keep the output-side rotary member non-rotatable to the shaft.

10. The electromagnetic clutch according to claim 1, wherein the outer circumference of the shaft is formed with a projection and a recess alternately to keep the output-side rotary member non-rotatable to the shaft.

11. The electromagnetic clutch according to claim 10, wherein the contour of the through hole of the output-side rotary member is such that a projection and a recess respectively engageable with the recess and the projection of the outer circumference of the shaft are alternately formed so as to keep the output-side rotary member non-rotatable to the shaft.

12. The electromagnetic clutch according to claim 1, wherein the outer circumference of the shaft is formed with at least one projection to keep the output-side rotary member non-rotatable to the shaft.

13. The electromagnetic clutch according to claim 12, wherein the contour of the through hole of the output-side rotary member is such that a recess engageable with the projection of the outer circumference of the shaft is formed so as to keep the output-side rotary member non-rotatable to the shaft.

14. The electromagnetic clutch according to claim 1 further comprising a tubular casing, wherein a flux of magnetic induction generates when the shaft is inserted in the tubular casing and the energizing coil is excited, an outer circumference of the shaft at a position for engaging with the tubular casing has a configuration generally identical to the configuration of the outer circumference of the shaft engageable with the output-side rotary member, and an inner circumference of the tubular casing is so configured as to keep the shaft non-rotatable to the tubular casing.

15. The electromagnetic clutch according to claim 14, wherein the outer circumference of the shaft is formed with an engaging portion extending in an axial direction of the shaft to be non-rotatably engageable with the output-side rotary member and the tubular casing.

16. The electromagnetic clutch according to claim 15, wherein the shaft has a flange at one end thereof with the engaging portion formed near the one end to be insertable in the tubular casing from the opposite end thereof.

17. The electromagnetic clutch according to claim 14, wherein the shaft is made of a resin.

* * * * *